United States Patent [19]

Snow

[11] Patent Number: 4,559,925

[45] Date of Patent: Dec. 24, 1985

[54] SOLAR COLLECTOR ASSEMBLY

[76] Inventor: Corinne M. Snow, 47 Sunset Dr., Delmar, N.Y. 12054

[21] Appl. No.: 605,299

[22] Filed: Apr. 30, 1984

[51] Int. Cl.$^4$ ............................................. F24J 3/02
[52] U.S. Cl. ..................................... 126/430; 126/428; 126/431; 350/264
[58] Field of Search ............... 126/417, 428, 429, 430, 126/431, 438, 439, 451, 450; 52/18, 306, 788; 350/258, 259, 260, 261, 262, 263, 264

[56] References Cited

U.S. PATENT DOCUMENTS

| | | | |
|---|---|---|---|
| 3,243,117 | 3/1966 | Morgan | 126/429 X |
| 4,018,024 | 4/1977 | Stelzer | 52/788 X |
| 4,059,226 | 11/1977 | Atkinson | 126/429 X |
| 4,069,809 | 1/1978 | Strand | 126/270 |
| 4,149,520 | 4/1979 | Arent | 126/270 |
| 4,207,865 | 6/1980 | Allen | 126/431 |
| 4,227,774 | 10/1980 | Corll | 350/263 |
| 4,398,530 | 8/1983 | Saunders | 126/439 |

FOREIGN PATENT DOCUMENTS

| | | | |
|---|---|---|---|
| 0071760 | 6/1981 | Japan | 126/431 |
| 0148144 | 9/1982 | Japan | 126/428 |
| 1056063 | 1/1967 | United Kingdom | 350/258 |

Primary Examiner—Margaret A. Focarino
Attorney, Agent, or Firm—Heslin, Watts & Rothenberg

[57] ABSTRACT

A solar collector assembly designed for installation in a southerly facing wall in order to heat the interior of an enclosed structure. The assembly comprises a transparent window combined with an outwardly extending fixed upper panel for blocking out the rays of the summer sun and an inwardly extending fixed lower panel with a reflective top surface for directing the rays of the sun inside during the cooler months. The window and fixed panels are situated in an open rectangular frame so that the window is tilted at an appropriate angle from the horizontal in order to maximize the thermal benefits of the sun. The frame provides both structural integrity and a means for mounting the solar assembly in the wall of the building. A hinged panel is attached to the outside of the assembly for shading the lower portion of the window when desired.

10 Claims, 4 Drawing Figures

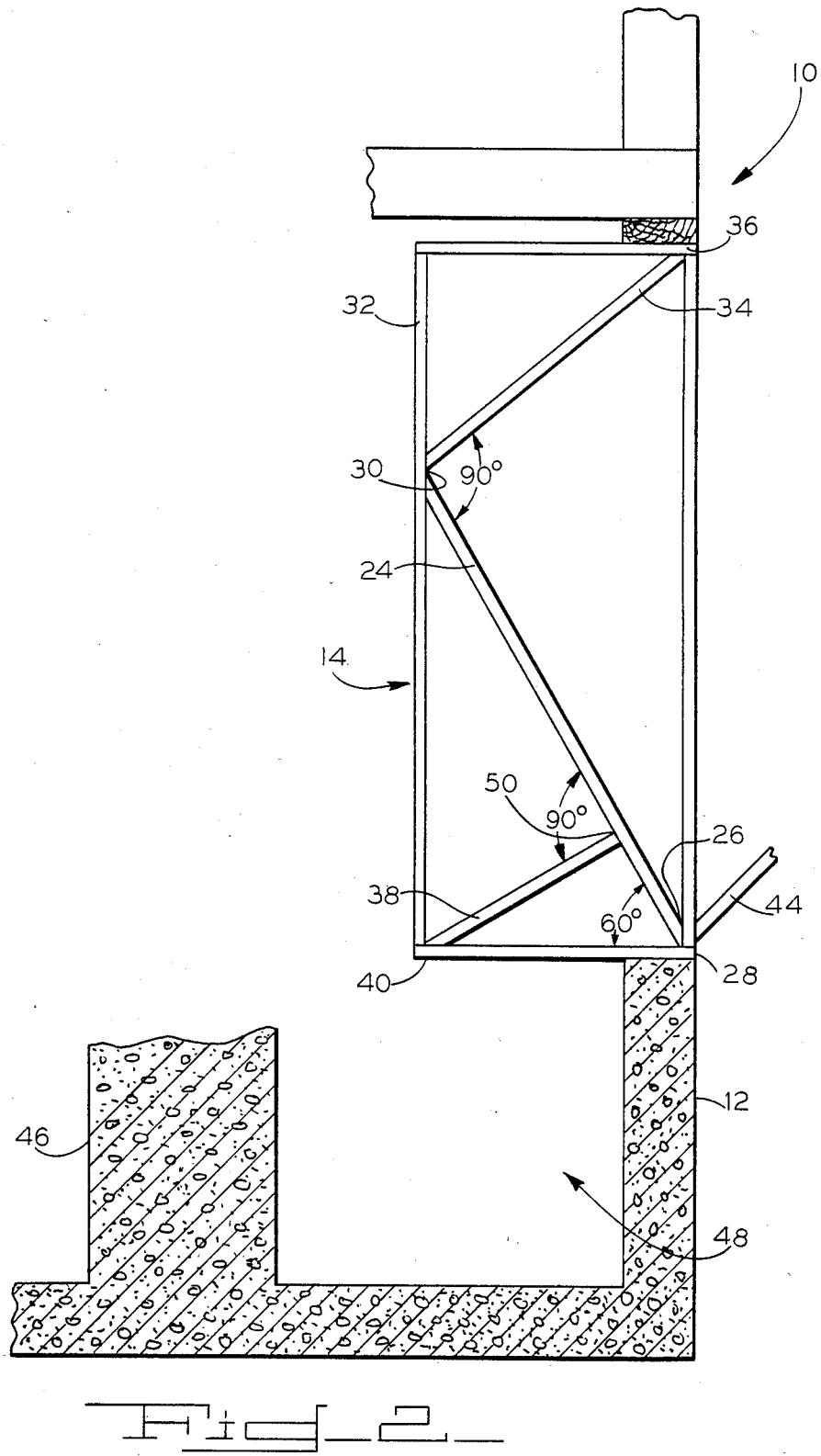
Fig_2

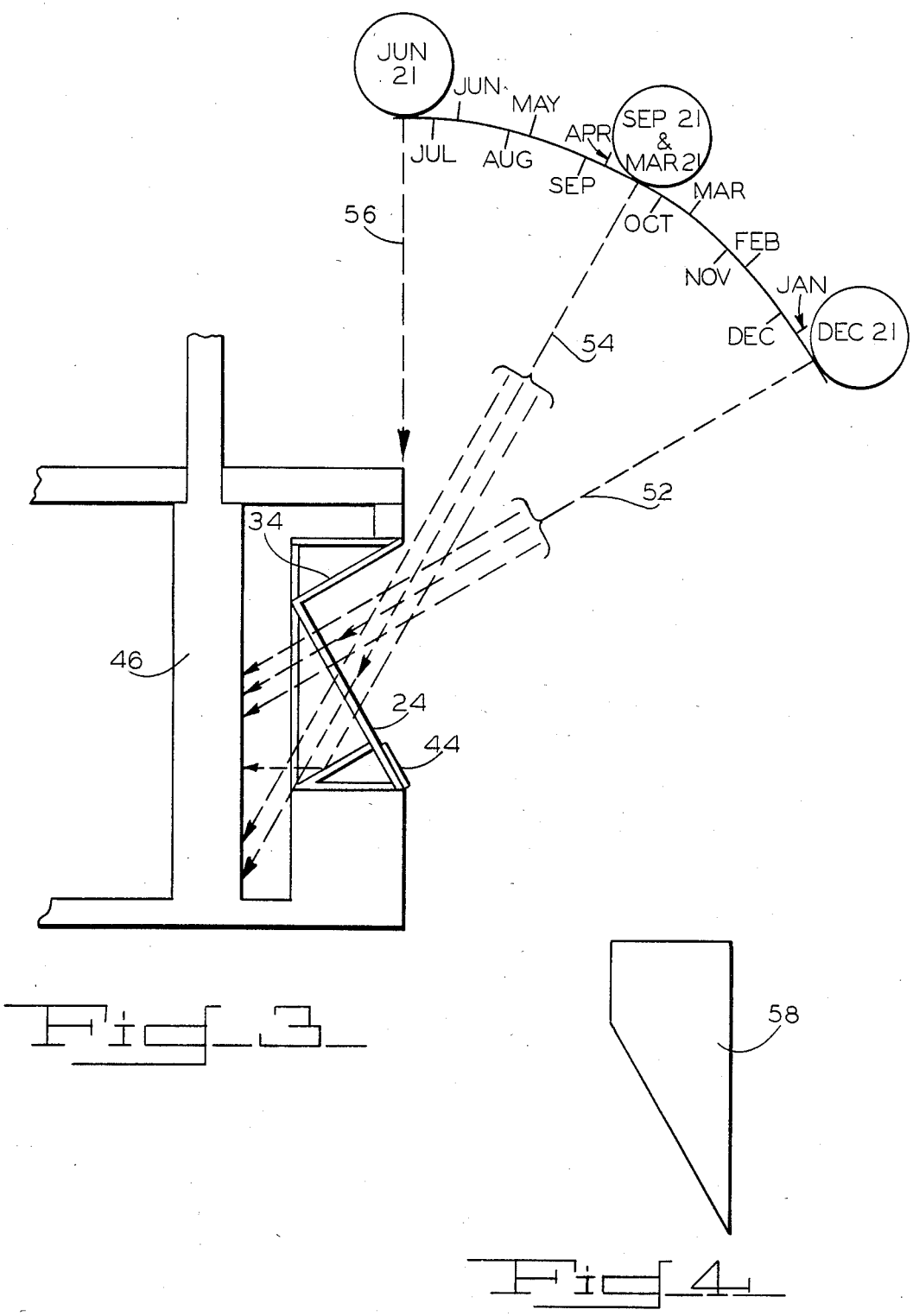
Fig_3_
Fig_4_

SOLAR COLLECTOR ASSEMBLY

FIELD OF THE INVENTION

This invention relates to a device for heating enclosed structures by utilizing solar energy. More specifically, this invention relates to a solar window assembly that is installed as part of a south facing wall.

BACKGROUND AND SUMMARY OF THE INVENTION

In the past decade, the political instability of the OPEC countries and the depletion of the fuel resources in this country have increased heating costs considerably. Alternate, inexpensive energy sources are being sought continuously. The ready availability of solar energy has made it a particularly attractive alternative to the more traditional heating fuels. As a result of this increased interest in harnessing solar energy, various types of solar systems have been devised. Generally, the solar systems are divided into two classes. The first class comprises the active type which utilizes a solar collector for heat storage which then ultimately transfers the energy to a functional heating mode. The second type of system is referred to as passive solar heating. Generally, this system involves orienting large expenses of glass towards a southern exposure in order to maximize the thermal benefits of the winter sun. The latter type is most often used to heat the interior air space of buildings. A strategically placed heat sink enhances the interior heat benefits especially during the cooler evening hours.

In a passive system, it is desirable to position the windows in such a manner as to permit the maximum amount of the winter sun's rays to pass through while diverting or blocking out the rays of the summer sun. Generally, the prior art devices use either vertically placed or angled windows in a southerly facing wall and attempt to block out the hot summer sun by the addition of adjustable awnings, movable panels or insulating blinds. For instance, one device of the prior art makes use of a vertically placed window unit combined with two exteriorly hinged panels, a top one for blocking out solar rays in the summer and a bottom one for reflecting the solar rays inwardly during the winter. There are many disadvantages with this type of solar unit. First, the window placement is vertical and therefore, not properly oriented for maximum exposure to the sun's rays in the winter. Secondly, placement of the exterior panels requires a complex network of ropes and pulleys in order to block out the summer sun, and, thirdly, the outwardly projecting panels are awkward and detract from the architectural aesthetics of most buildings.

A second popular prior art device for solar heating makes use of a greenhouse type construction that combines a vertical expanse of glass with an angled glass roof that is oriented towards the sun in order to admit the maximum amount of sun during the winter months. The major disadvantage with the greenhouse system involves the difficulty in controlling unwanted heat build-up during the warmer months. Greenhouse designs generally incorporate ventilating systems and movable internal and/or external shading devices. Additionally, because glass is a poor insulator, insulating layers such as blinds must be used in order to prevent heat loss during the cooler hours.

The present invention hereinafter described, offers vast improvement over the prior art devices by providing a solar assembly having a structurally integrated arrangement that maximizes the absorption of heat in the winter and minimizes that absorption in the summer.

It is, therefore, an objective of this invention to provide a solar collector assembly that can be installed in preferably a southerly facing wall.

It is a further objective of this invention to provide a totally integrated unit that can be used in new construction or to retrofit an existing house with very little change in structure.

It is a further objective of this invention to provide a solar collector assembly that does not require any ancillary devices, such as awnings or movable insulation.

It is a further objective of this invention to provide an aesthetically attractive assembly that can be incorporated into any architectural style, without compromising or detracting from the appearance of the building.

It is a further objective of this invention to provide a solar collector assembly that is both easily and economically manufactured.

Briefly described, the present invention is a solar collector assembly for installing in the side of a building. The assembly comprises a transparent window with upper and lower ends, having a fixed upper panel that extends outwardly at a right angle to the window and a fixed lower reflective panel that extends inwardly also at a right angle to the window. An open frame is provided for mounting the solar assembly in the side of the building. The window is secured within the frame by attaching the lower end of the window to the bottom front of the frame and then tilting the window backwards so that the upper end of the window is secured to the backside edges of the frame. In northern latitudes it is desirable to install the window at an angle of 60° from the horizontal. This is accomplished by maintaining a 1:2 ratio between the depth of the frame and the length of the window.

The solar assembly is also provided with an exteriorly mounted hinged panel attached to the front bottom edge of the frame which is used for shading the lower portion of the window at certain times of the year.

BRIEF DESCRIPTION OF THE DRAWING

FIG. 2 is a cross-sectional view of the installed solar assembly in combination with a heat sink.

FIG. 3 is a combined schematic and cross-sectional view of the solar assembly illustrating the manner in which the rays of the sun strike the individual components of the assembly at various times of the year.

FIG. 4 is a side elevation view of one of the end boards for this invention.

DETAILED DESCRIPTION OF THE DRAWING

Figure 1:
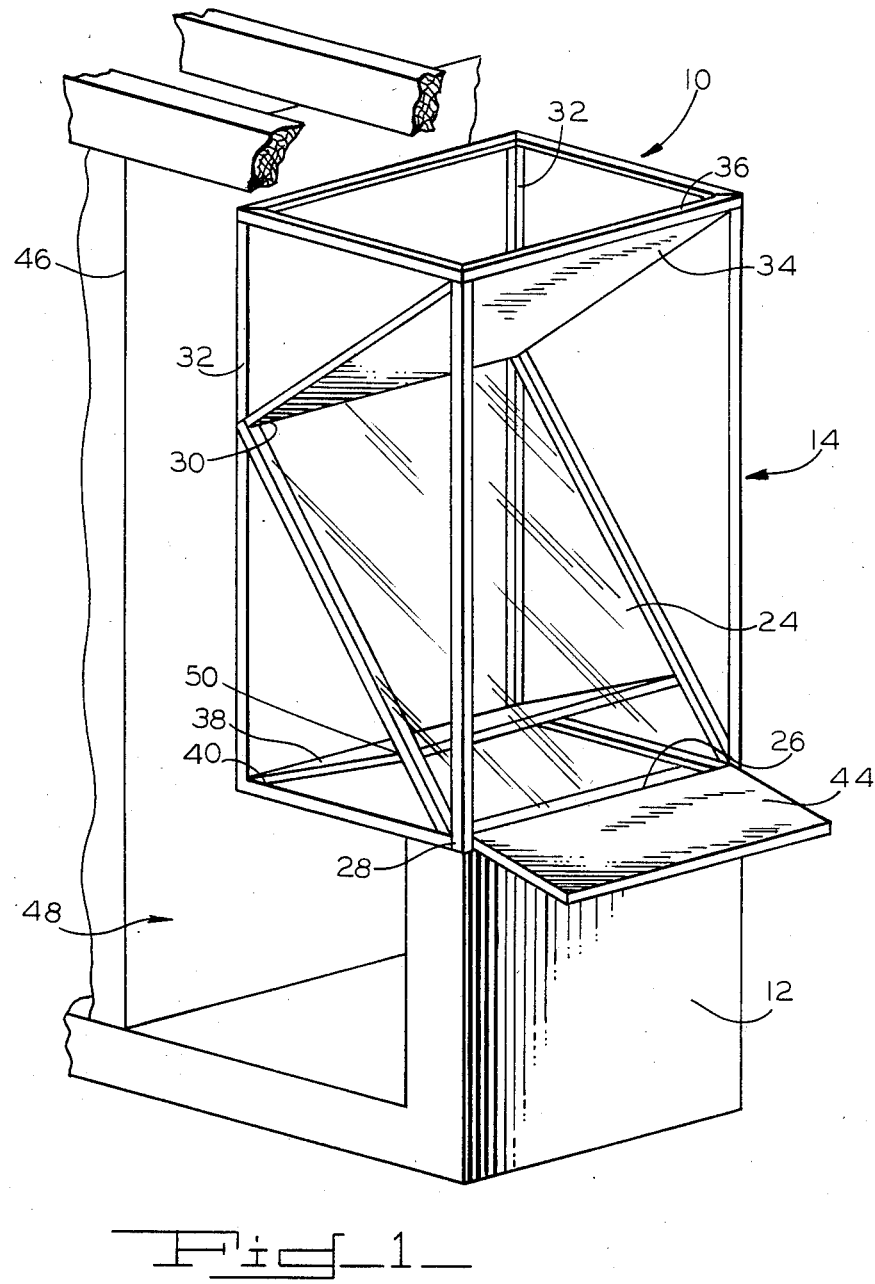
FIG. 1 is a perspective view of the solar assembly as typically installed in a building structure.

With reference to FIG. 1, solar assembly 10 generally comprises a transparent window 24 having an upper end 30 and a lower end 26. A fixed upper panel 34 is connected to upper end 30 and extends outwardly forming a right angle with the plane defined by window 24. A fixed lower panel 38 extends inwardly and also forms a right angle with the plane defined by window 24. Lower panel 38 is joined to window 24 at a predetermined distance above lower end 26, the exact location will be discussed in more detail below. The means for mounting solar assembly 10 in a given structure is preferably by enclosing the assembly in open rectangular frame 14. Frame 14 has edges defining a top, bottom, front and two sides. Assembly 10, as shown in FIG. 1, is installed so that the front is flush with exterior wall 12, thus producing an attractive, clean apperance to the exterior side of the building. Transparent window 24 is secured and mounted within frame 14 such that lower end 26 is secured to front bottom edge 28 of frame 14. Upper end 30 of window 24 is secured to backside edges 32 of frame 14, the desired tilt is obtained by maintaining a 1:2 ratio between depth of frame 14 and the length of window 24. Fixed upper panel 34 connects upper end 30 of window 24 to top front edge 36 of frame 14. Fixed lower panel 38 extends from the back surface of window 24 to back bottom edge 40 of frame 14. This Z-shaped configuration, in addition to accomplishing the desired solar functions, imparts an increased degree of strength and stability of the entire assembly. Hinged panel 44 is located on the exterior side of window 14 and is pivotally mounted to bottom front edge 28 of frame 14 by a pair of hinges (not shown).

In order to maximize the thermal benefits of the sun's rays especially on either side of the spring and fall equinoxes, fixed lower panel 38 is covered with reflective material so that the rays of the sun striking the reflective surface will be directed towards heat sink 46. Also, when hinged panel 44 is located in its up position, it may be desirable to cover its outwardly facing surface with reflective material. As can be seen in FIG. 3, hinged panel 44 would be located in the up position when the sun is approaching the summer solstice. It is at this time especially during the months of July and August that indoor temperatures tend to be higher and one prefers to either block the sun's rays completely or reflect them outwardly.

An optional feature of this invention includes the placement of a water tank in the void space 48. If this is done and the sun's rays are used to heat the water, hinged panel 44 would be located at its down position during the day and its up position during the evening hours and on cloudy days in order to prevent heat loss through the glazing of window 24.

Referring now with greater particularly to the preferred embodiment of this invention as illustrated in FIG. 2. The framing for transparent window 24 is generally constructed of redwood stock, the outside dimensions being 48 in. by 31 in. Double plate insulating glass is generally used for window 24, however any of the newer more efficient thermal plastics could be substituted. In a northern latitude between 40°-45°, it is important to maintain an angle of approximately 60° between the plane defined by window 24 and the plane defined by the bottom edges of frame 14. This 60° angle adapts itself to the natural position of the sun as the earth revolves and tilts. On Dec. 21, the sun at noon is at an angle of approximately 60° above the horizon, therefore, all of the available sunlight is admitted directly and most efficiently when window 24 is set at an angle of 60° from the horizontal. In the spring and fall, approximately one-half of the available sunlight passes through window 24. On June 21 when the sun comes within 2 or 3 degrees of vertical, the tilt of window 24 combined with fixed upper panel 34 completely blocks out the sun's rays. Fixed lower panel 38 is joined to window 24 forming a 90° angle between the two planar surfaces. The point of jointure 50 is located one foot above window lower end 26 and three feet below window upper end 30. Fixed lower panel 38, preferably constructed of exterior grade plywood and having a thickness of about ⅜", extends inwardly and is beveled in order to facilitate attachment to frame back bottom edge 40. Generally the inner joints of solar assembly 10 are glued and then reinforced with appropriate nails and screws.

The outer dimensions of solar assembly 10 can be varied to fit any large, standard sized window opening. As indicated above, the depth of frame 14 must be one half the length of window 24, in the preferred embodiment these dimensions are two feet and four feet, respectively. This ratio ensures the 60° angle of the tilt of window 24. Window 24 is preferably planar, but could be curved if desired.

The path of solar heat at noon at various times of the year is indicated in FIG. 3. On Dec. 21, the path of solar heat follows line 52 directly through window 24, the rays being transverse to the planar surface of window 24. Line 54 follows the solar path as it would occur at the spring equinox of Mar. 21 and the fall equinox of Sept. 21. As illustrated, line 54 passes through window 24 at approximately a 60° angle and is diverted inwardly when it hits the reflective surface of fixed lower panel 38. When solar assembly 10 is combined with heat sink 46, which in the preferred embodiment is illustrated as a Trombe wall, the solar heat is absorbed throughout the day and then released later during the cooler evening hours. The solar path of June 21 summer solstice is represented by line 56. At this time of the year the sun is almost directly overhead and fixed upper panel 34 prevents the rays from passing through or striking window 24.

Alternately, if the admission of light is not important, window 24, instead of being transparent, could be constructed of a heat absorbing material that would be connected to a heat transfer device (not shown) for the consumption or storage of solar heat. This type of collector would be particularly desirable for incorporation into a southerly facing basement or attic wall.

Any number of solar assemblies can be used, either set as a series side by side, or separately, depending upon the architecture of the building. End boards 58, as illustrated in FIG. 4, are designed to enclose each side of solar assembly 10 or each side end of a series of assemblies. Solar assembly 10 should be oriented to the south, although variances of 25° to either the east or west are tolerable.

As is evident from the above description, an efficient solar assembly has been provided which accomplishes all of the objectives stated herein. Although various and minor modifications may be suggested by those familiar with the art, it should be understood that the scope of the above invention is intended to be limited only by the appended claims.

I claim:
1. A self contained solar collector assembly for installing in the side of a building comprising:
  a transparent window having upper and lower ends, the window being inclined with respect to horizontal at an angle to substantially maximize direct transmission of available winter solar rays through the window;
  a fixed upper panel extending outwardly at a right angle to the window, said upper panel being non-transmissive to solar rays and serving to shade the window from the sun's rays during the summer;
  a fixed lower panel extending inwardly at a right angle to the window, said lower panel having a solar ray reflective surface portion for reflecting inwardly substantially all of the solar rays transmitted through said window and incident upon said surface portion; and frame means for supporting the window and upper panel and lower panel in fixed relationship and for mounting the solar assembly in the side of the building.

2. The invention of claim 1 wherein said frame means comprises a generally open frame having edges defining a top, a bottom, a front, a back and two sides.

3. The invention of claim 2 wherein the lower end of the transparent window is secured to the front bottom edge of the frame and the upper end of the transparent window is secured to the backside edges of the frame at a predetermined location that enables the fixed upper panel to connect with the top front edge of the frame.

4. The invention of claim 3 wherein the fixed lower panel connects with the back bottom edge of the frame.

5. The invention of claim 4 further comprising a hinged panel, pivotally mounted to the bottom front edge of the frame, to selectively overlie a lower portion of the window.

6. The invention of claim 5 wherein the hinged panel has a surface covered with reflective material for reflecting solar rays away from the window when the hinged panel overlies said lower portion of the window.

7. The invention of claim 3 wherein the length of the window is in a corresponding relationship to the depth of the frame so that the window is tilted at a predetermined angle from the horizontal.

8. The invention of claim 7 wherein the depth of the frame is one-half the length of the window and the angle between the plane of the bottom of the frame and the plane of the window is 60°.

9. The invention of claim 2 further comprising a covering that extends at least partially over at least one of the two sides of the frame.

10. The invention of claim 1 in combination with a heat sink placed interiorly and at a predetermined distance from the solar assembly.

* * * * *